(12) United States Patent
Völlinger et al.

(10) Patent No.: US 10,675,649 B2
(45) Date of Patent: Jun. 9, 2020

(54) PAINTING FACILITY AND METHOD FOR PAINTING A WORKPIECE, AND FILTER ELEMENT FOR THIS PURPOSE

(71) Applicant: Sturm Maschinen- & Anlagenbau GmbH, Salching (DE)

(72) Inventors: Ralf Völlinger, Straubing (DE); Uwe Ratzka, Leiblfing (DE); Simon Hoffmann, Mengkofen (DE)

(73) Assignee: Sturm Maschinen- & Anlagenbau GmbH, Salching (DE)

( * ) Notice: Subject to any disclaimer, the term of this patent is extended or adjusted under 35 U.S.C. 154(b) by 126 days.

(21) Appl. No.: 16/083,471

(22) PCT Filed: Feb. 17, 2017

(86) PCT No.: PCT/EP2017/053600
§ 371 (c)(1),
(2) Date: Sep. 7, 2018

(87) PCT Pub. No.: WO2017/157608
PCT Pub. Date: Sep. 21, 2017

(65) Prior Publication Data
US 2019/0047007 A1    Feb. 14, 2019

(30) Foreign Application Priority Data
Mar. 16, 2016    (EP) .................... 16160739

(51) Int. Cl.
*B05B 14/43*    (2018.01)
*B01D 46/00*    (2006.01)
(Continued)

(52) U.S. Cl.
CPC ............ *B05B 14/43* (2018.02); *B01D 46/001* (2013.01); *B01D 46/2411* (2013.01);
(Continued)

(58) Field of Classification Search
None
See application file for complete search history.

(56) References Cited

U.S. PATENT DOCUMENTS

2008/0092501 A1*    4/2008    Sporre ............... B01D 46/2411
                                              55/493
2011/0290116 A1    12/2011    Jarrier et al.

FOREIGN PATENT DOCUMENTS

DE    34 06 464 A1    9/1985
DE    201 05 239 U1    7/2001
(Continued)

OTHER PUBLICATIONS

International Search Report issued in PCT/EP2017/053600; dated Jun. 6, 2017.
(Continued)

*Primary Examiner* — Nathan T Leong
(74) *Attorney, Agent, or Firm* — Studebaker & Brackett PC

(57) ABSTRACT

The invention relates to a painting facility and a method for painting a workpiece, wherein, in a painting station, a coating is sprayed onto the workpiece by way of at least one painting device, and in an extraction station, which is arranged outside the painting station, air with overspray is extracted out of the painting station via an extraction device with a filter element, wherein overspray is separated out of the extracted air at the filter element. According to the invention it is provided that the exhaust air is led away via an extraction opening which is arranged in a lower region of the extraction station, wherein the filter element is placed onto the extraction opening, wherein the filter element is arranged approximately centrally in an extraction chamber of the extraction station. The invention further relates to a filter element provided for this purpose.

12 Claims, 6 Drawing Sheets

(51) Int. Cl.
*B01D 46/24* (2006.01)
*B05B 13/04* (2006.01)

(52) U.S. Cl.
CPC .... *B05B 13/0452* (2013.01); *B01D 2275/201* (2013.01); *B01D 2275/206* (2013.01); *B01D 2279/35* (2013.01)

(56) References Cited

FOREIGN PATENT DOCUMENTS

| | | |
|---|---|---|
| DE | 102 09 499 A1 | 10/2003 |
| DE | 10 2005 013 710 A1 | 9/2006 |
| DE | 10 2008 046 409 A1 | 5/2010 |
| DE | 10 2009 034 863 A1 | 10/2010 |
| DE | 10 2011 108 631 A1 | 1/2013 |
| DE | 20 2015 101 003 U1 | 4/2015 |
| EP | 0 526 533 B1 | 12/1995 |
| EP | 0526533 * | 12/1995 |
| EP | 3 050 611 A1 | 8/2016 |
| WO | 2016/065451 A1 | 5/2016 |

OTHER PUBLICATIONS

International Preliminary Report on Patentability issued in corresponding International Application No. PCT/EP2017/053600.

\* cited by examiner

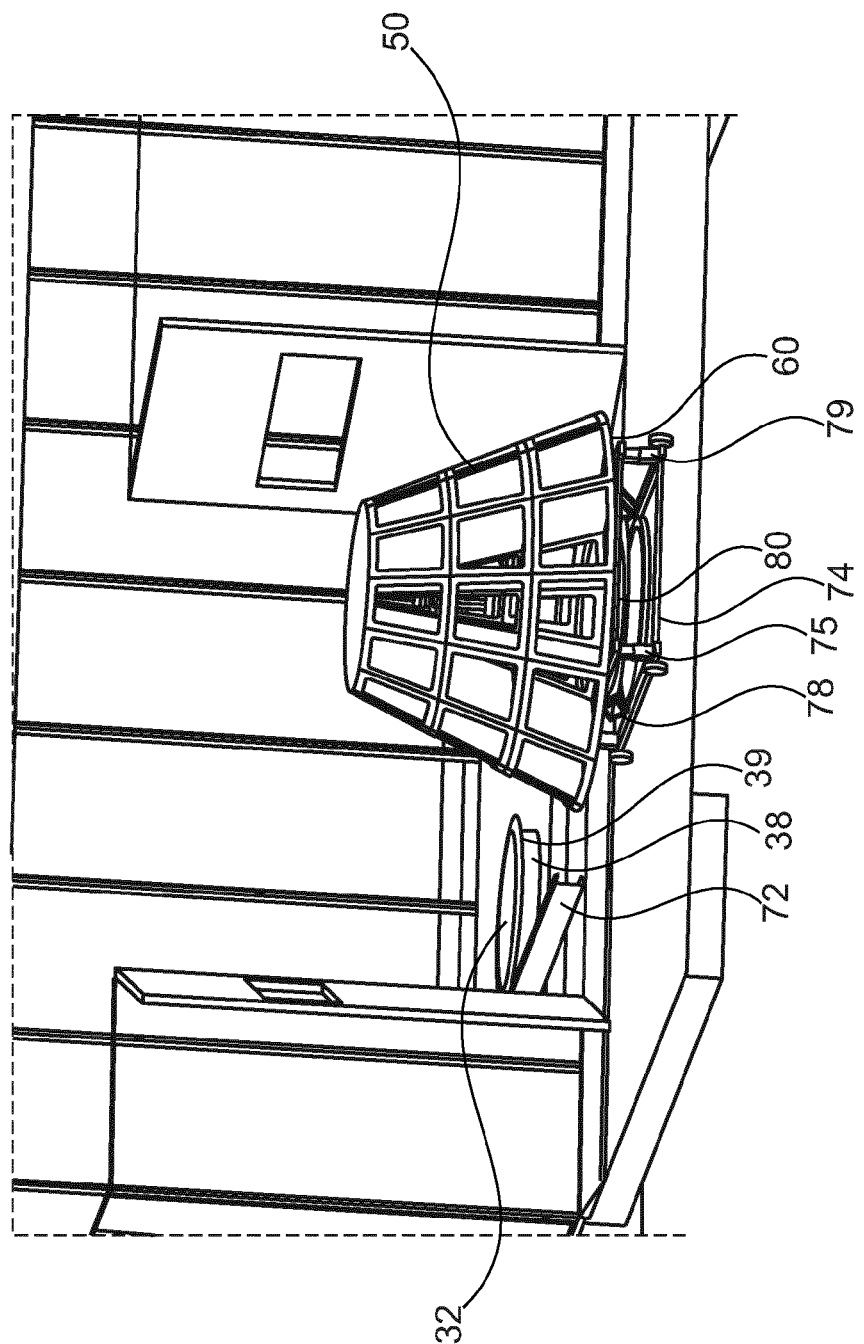

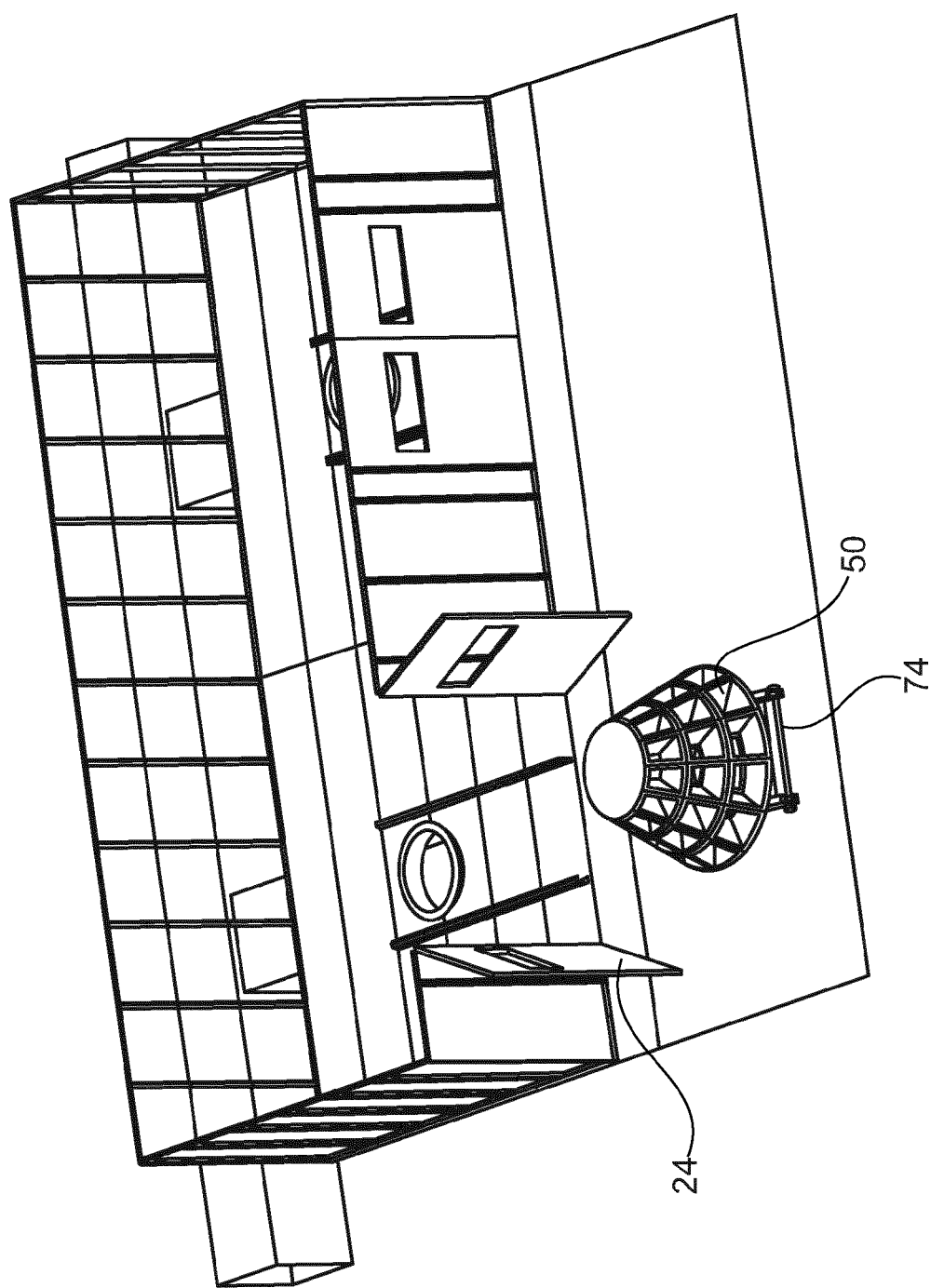

PAINTING FACILITY AND METHOD FOR PAINTING A WORKPIECE, AND FILTER ELEMENT FOR THIS PURPOSE

The invention relates to a painting facility for painting a workpiece with a painting station, in which a coating can be applied to the workpiece by way of at least one painting device, and an extraction station, which is arranged underneath the painting station and has an extraction device with a filter element, via which air with overspray can be extracted out of the painting station, wherein overspray is separated out of the extracted air at the filter element, according to the preamble of claim 1.

The invention further relates to a filter element for separating overspray out of extracted air from a painting facility, having a filter surface which is designed to let through air and separate overspray out of the air, and an outlet opening for guiding filtered air out of the filter element, according to the preamble of claim 6.

Furthermore, the invention relates to a method for painting a workpiece, wherein, in a painting station, a coating is sprayed onto the workpiece by way of at least one painting device, and in an extraction station, which is arranged underneath the painting station, air with overspray is extracted out of the painting station by way of a filter element, wherein overspray is separated out of the extracted air at the filter element, according to the preamble of claim 12.

Prior art of this generic kind follows from DE 10 2011 108 631 A1. In this known method and known device, air with overspray is extracted downwards via an extraction device from a painting station situated above. An extraction opening is provided in a top region of the extraction station. The extracted air is guided from above via this opening into a box-shaped filter element. The filtered air is then directed out at a rear face of the box-shaped filter element.

A system for coating objects with powder follows from DE 102 09 499 A1. In this powder coating facility, filter units are suspended along rails in a lower region such that they can be displaced. The filter units have a drum-shaped or cuboid section and beneath a funnel-shaped section is arranged. The funnel-shaped section serves to collect separated powder particles, which can be led away via lines for reuse.

A separation system for color particles in the exhaust air from painting booths follows from DE 201 05 239 U1. Laterally positioned, interchangeable filter cartridges are provided for separating air.

A filter for filtering spraying mist is known from DE 1 0 2009 034 863 A1. The filter has an active filtering medium in the form of a paper sheet, wherein filter bags are formed from the paper sheet. The filter bags are grouped together in a modular manner.

In the so-called dry separation of overspray from painting facilities, the aim is to separate out as much overspray as possible at the interchangeable filter elements. If overspray disposes at the walls of the facility, a viscous, tacky paint layer is formed, which must be removed regularly in a laborious process. In order to reduce the effort associated with removing the paint layers from facility walls, it is known that a layer of oil or grease may be applied to the walls in order to facilitate removal. Regular maintenance of these painting facilities is thus associated with a great deal of time and effort and reduces the useful time of the overall system.

The object of the invention is to specify a painting facility, a method for painting and a filter element for this purpose, which enable especially economical operation when painting.

The object is achieved with a painting facility having the features of claim 1, a filter element having the features of claim 6, and a method having the features of claim 12. Preferred embodiments of the invention are indicated in the respective dependent claims.

The painting facility according to the invention is characterized in that an extraction opening for leading away exhaust air is arranged in a lower region of the extraction station, that the filter element is placed onto the extraction opening, and that the filter element is arranged approximately centrally in an extraction chamber of the extraction station.

A basic concept of the invention is the arrangement of a filter element approximately centrally and free in an extraction chamber of the extraction station underneath the painting station. For this end, the filter element is designed such that a free flow of cabinet air with overspray is enabled from all sides. Feeder ducts for feeding the air to the filter element are not provided for this purpose. This eliminates the need for corresponding duct walls on which paint overspray could be deposited to a relatively great extent. The free positioning of the filter element in an extraction chamber enables air to flow over the filter element on all sides. As a result, the cabinet air containing paint is largely kept away from the surrounding walls of the extraction chamber. Over time, only a relatively small amount of paint is deposited on the walls of the extraction chamber. This significantly increases the maintenance cycles while considerably reducing maintenance effort.

In a preferred embodiment of the invention, at least one air inlet opening is provided on the painting station, through which air inlet opening air can be fed. Fresh air is therefore constantly fed to the painting station, so that a flow is established from the workpiece to the extraction station. This prevents excessive concentrations of paint in the cabinet air.

According to a further refinement of the invention, it is especially preferable for at least one air inlet opening to be arranged above the workpiece, wherein air can be fed through the air inlet opening onto the workpiece. Preferably, multiple air inlet openings are provided. Especially good air flow on the workpiece, which may be in particular a car body, can therefore be achieved. The workpiece is preferably positioned centrally in the painting station, preferably directly vertically above the freestanding filter element in the extraction chamber below. Fresh air may also flow along the walls, which counteracts paint deposits.

Further good removal of the air containing paint from the painting station is achieved according to a further refinement of the invention, in that the painting station at the top is separated from the extraction station at the bottom via an air-permeable, preferably lattice-like separating floor.

From an environmental perspective, it is especially advantageous for the at least one air inlet opening to be connected to the extraction opening via at least one duct, wherein at least part of the filtered exhaust air can be fed back into the painting station. A moisture separator may be provided within the duct in addition to a pumping or ventilation unit. It is also advantageous for fresh air to be partially fed to the returned air via a control unit and, at the same time, for part of the filtered exhaust air to be directed to the outside.

The filter element according to the invention is characterized in that the filter element has a base in which the outlet opening is formed approximately centrally, and that above the base the filter surface forms an outer circumference region of the filter element and encloses a filter interior which is connected to the outlet opening. Overall, the filter element is designed such that air can flow into the filter element largely via the entire outer circumference. This enables uniform air flow via the outer circumference region to be achieved. All parts of the filter surface can thus be used evenly. This increases the service life of the filter element.

In a preferred embodiment of the filter element according to the invention, the base is made of metal for receiving and holding a detachable filter unit, and a sleeve-shaped attachment piece is provided on the underside of the base and is designed to be detachable placed onto an extraction opening of a painting facility. The metal base with the attachment piece is therefore reusable and can form the basis of a basic frame for the filter element. Upward-pointing supports or fixing elements for the filter unit can also be provided on the base.

According to a preferred refinement, it is provided that at least the detachable filter unit is designed as a disposable element. This eliminates the need for laborious removal of the viscous, tacky paint layer that has been deposited on the filter surface of the filter unit. Overall, the filter unit is made of a cost-effective and functional material.

In a further preferred embodiment of the invention, the filter element and/or the filter unit have a circumference region that tapers upwards from the base. This enables excellent extraction of air containing paint that flows from above over a large area. With this design, air containing overspray is efficiently directed away from the walls of the painting facility, so that the paint contamination of the latter is reduced.

In an especially functional shaping, the filter element and/or the filter unit has the form of a cone, a truncated cone, a hemisphere, a smooth or a stepped pyramid.

In an especially cost-effective embodiment, the invention provides that filter cells are provided to form the filter surface and are made at least in part of a cardboard or paper material. The filter cells may be made entirely of cardboard or paper material, or comprise additional air-permeable nonwoven materials made of textiles, lattice-like elements, or other suitable filter elements. The filter cells form partial areas of the filter unit. The individual filter cells can be interchangeable.

Furthermore, it is preferred for the filter element to be covered by a filter material, in particular on its outside. The filter material may be a filter nonwoven, a filter fabric, a filter membrane or another air-permeable filter structure. The filter material may be stretched across a frame that may be foldable. Combinations with other filter materials on the inside or outside are possible.

The method according to the invention for painting a workpiece is characterized in that the exhaust air is led away via an extraction opening which is arranged in a lower region of the extraction station, and that the filter element is placed onto the extraction opening, wherein the filter element is arranged approximately centrally in an extraction chamber of the painting station. The previously described advantages are able to be achieved using the method according to the invention.

It is particularly preferable to use a painting facility as described above. It is further preferred according to the invention for the air to be extracted via a filter element as described above.

The invention will be described further hereinafter by way of preferred embodiments, which are shown schematically in the drawings, in which:

FIG. 4 is an enlarged detail view of the painting facility according to the invention from FIG. 2 and FIG. 3 upon retraction of a filter element from the extraction station;

FIG. 5 is a perspective view of the painting facility from FIGS. 2 to 4 upon insertion of a new filter element;

Figure 1:
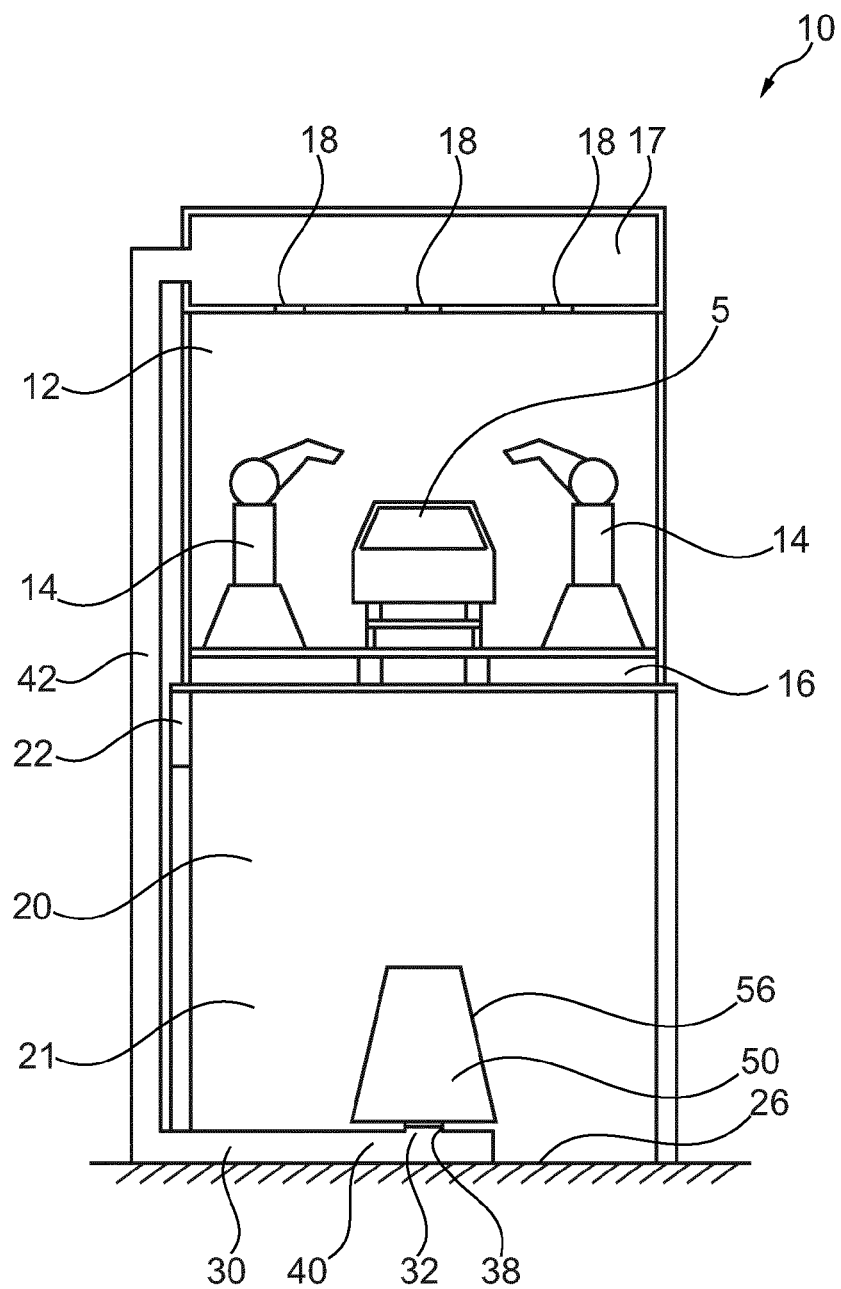
FIG. 1 is a schematic cross-sectional view of a painting facility according to the invention.

A painting facility 10 according to the invention as shown in FIG. 1 has a painting station 12 at the top and an extraction station 20 underneath, which stations are separated from each other by a lattice-like, air-permeable separating floor 16. In the painting station 12, a workpiece 5 is provided with a paint coating by way of one or more painting devices 14. In the exemplary embodiment shown, the workpiece 5 is a body of a motor vehicle, which is painted by painting robots acting as painting devices 14. Fresh air is constantly fed in via air inlet openings 18 from an inlet duct 17 in the ceiling region of the painting station 12. Exhaust air containing fine paint particles, also called overspray, is diverted downwards via the separating floor 16 into the extraction station 20.

The extraction station 20 has an extraction chamber 21 which is delimited by side walls 22. In a center region of the extraction chamber 21, an extraction device 30 with a frustoconical filter element 50 is arranged in a base region 26. The filter element 50 is positioned onto a centering piece 38 of an extraction opening 32, as is described in more detail below. To form the extraction device 30, the extraction opening 32 is connected to a duct 40, which extends along the base region 26 to the outside. The duct 40 leads via a vertical feed 42 to the inlet duct 17 in the ceiling region of the painting station 12. This enables filtered air to be fed back into the painting station 12. The flow can be generated by a pump or a fan, which is not shown. Furthermore, additional treatment devices can be provided along the feed 42, such as a means for dehumidifying the air, or a means for warming or cooling, or a means for introducing fresh outside air and/or leading away process air to the outside.

Air with overspray is extracted downwards at the center via the extraction device 30 with the centrally arranged filter element 50, which is spaced apart from the side walls 22 along the entire circumference, namely at a spacing of preferably 1 to 3 meters, so that a deposition of paint particles on the side walls 22 is reduced or largely avoided.

Figure 2:
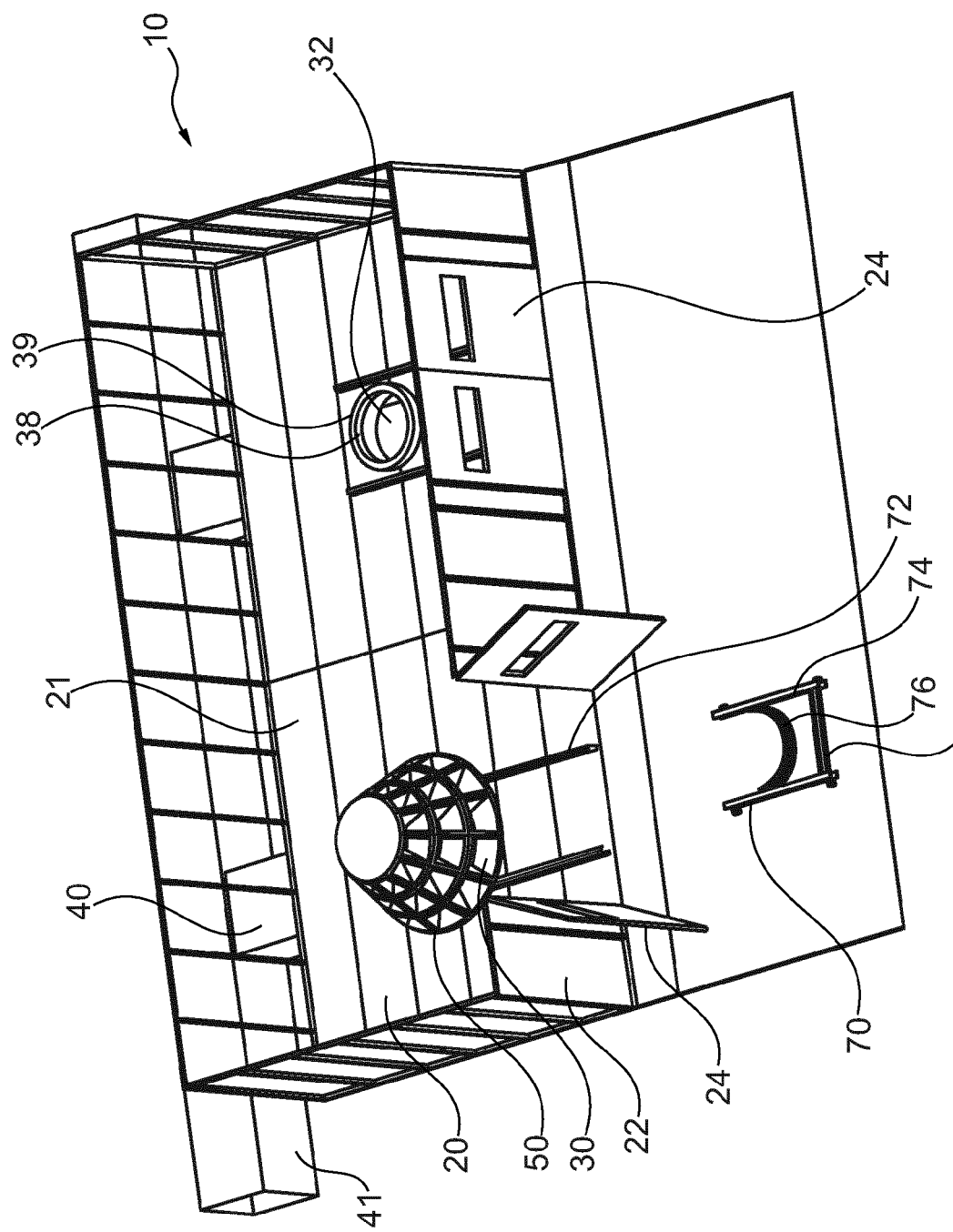
FIG. 2 is a perspective view of an extraction station of a painting facility according to the invention.

The paint particles in the extracted air can settle on a filter surface 56 of the filter element 50. The filter element 50 thus gradually becomes clogged, so that the filter element 50 must be replaced at prescribed intervals. As shown in FIG. 2, the painting facility 10 is provided with a changing device 70 according to the invention. This comprises a transport trolley 74, which has a chassis 75 with wheels. To enable precise pickup or placement of a filter element 50, the transport trolley has a semicircular stop 76, which is formed in such a manner that it corresponds to a sleeve-shaped centering piece 38 with an annular receiving flange 39. The centering piece 38 is shown at a second extraction opening 32 of the extraction device 30 in the extraction chamber 21, wherein in the arrangement according to FIG. 2 a filter element 50 has not yet been placed on this second extraction opening 32. The extraction openings 32 are in each case connected via horizontally running ducts 40 with a transverse collection duct 41 in order to execute an air-return of the filtered air.

Figure 3:
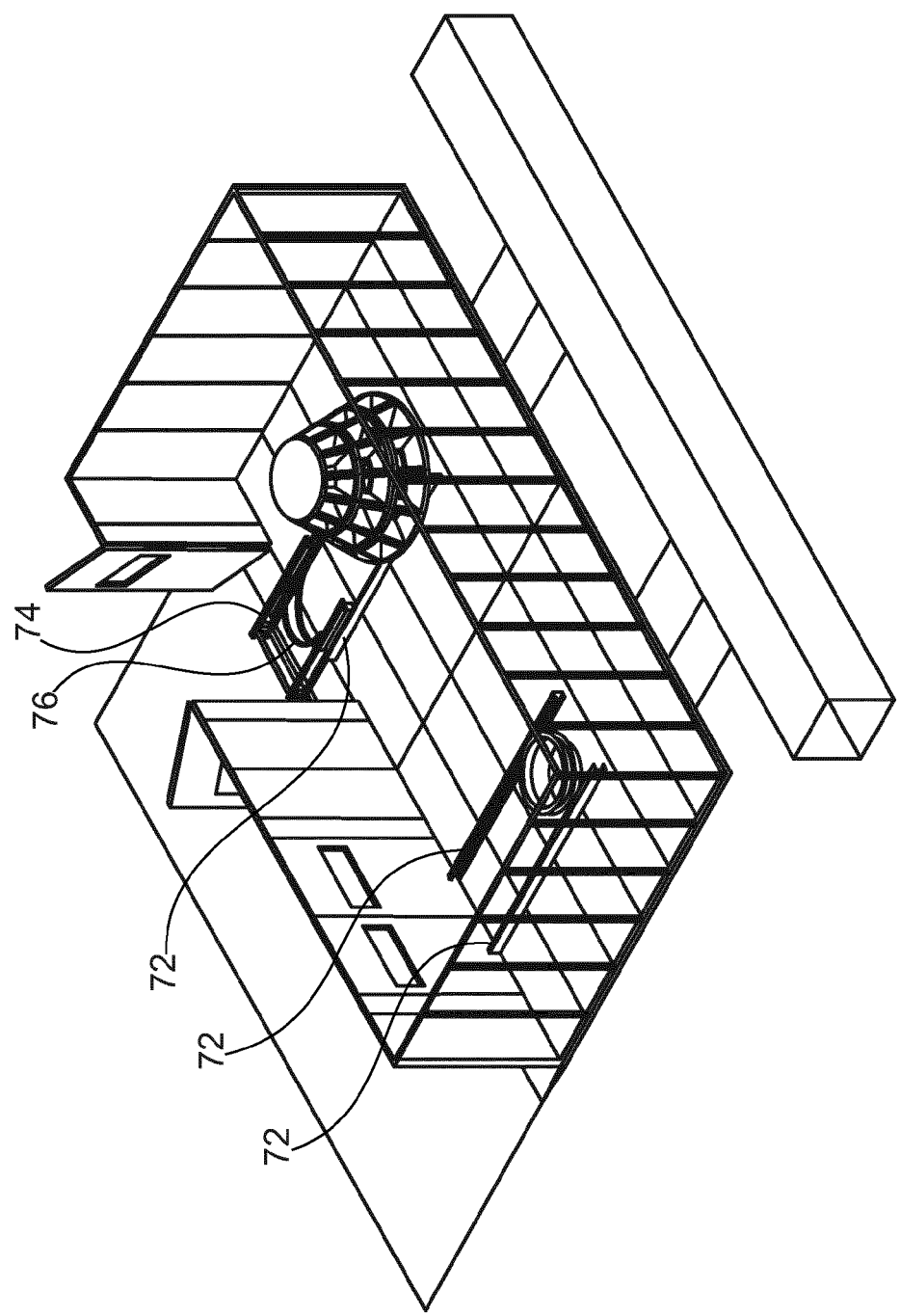
FIG. 3 is a further perspective view of the painting facility from FIG. 2 upon replacement of a filter element.

To carry out the replacement, the double-wing gates 24, which are provided in the side walls 20, are opened. Then, according to FIG. 3, the transport trolley 74 can be moved into the extraction chamber 21 along two parallel, C-shaped rails 72, as clearly illustrated in FIG. 3. The trolley can be pushed in by hand or automatically. The rails 72 can also continue outside the extraction station 20. The transport trolley 74 is moved towards the filter element 50 until the semicircular stop 76 abuts the centering piece 38. A top receiving part 80 of the chassis 75 of the transport trolley 74 can then be raised by means of a lifting device 78. The receiving part 80 of the chassis 75 is connected to the lower chassis 75 via vertical telescopic struts 79 in such a manner that the height is adjustable. The lifting device 78 may be embodied with a toggle lever mechanism similar to a car jack. The lifting device 78 can be actuated manually or pneumatically or hydraulically with positioning cylinders.

The lifting device 78 brings the receiving part 80 of the chassis 75 into contact with a plate-shaped base 60 of the filter element 50, wherein the entire filter element 50 is lifted off a receiving flange 39 on the centering piece 38 of the extraction opening 32. In this raised transport position, the filter element 50 can now be pushed outwards with the transport trolley 74, as illustrated in FIG. 4. This can be done manually or via a motor.

The used filter element 50 can be transported away by the transport trolley 74 for disposal. At the same time, a new filter element 50 can be inserted into the extraction station 20 via the same or a different transport trolley 74, as illustrated in FIG. 5. The semicircular stop 76 on the transport trolley 74 enables the new filter element 50 to be centered on the transport trolley 74 and, upon insertion, to be arranged and set down centered in relation to the extraction opening 32. The gate 24 can then be closed again so that the operation of the painting facility 10 can continue. Quick, simple replacement of the filter element 50 is enabled in this manner.

Figure 8:
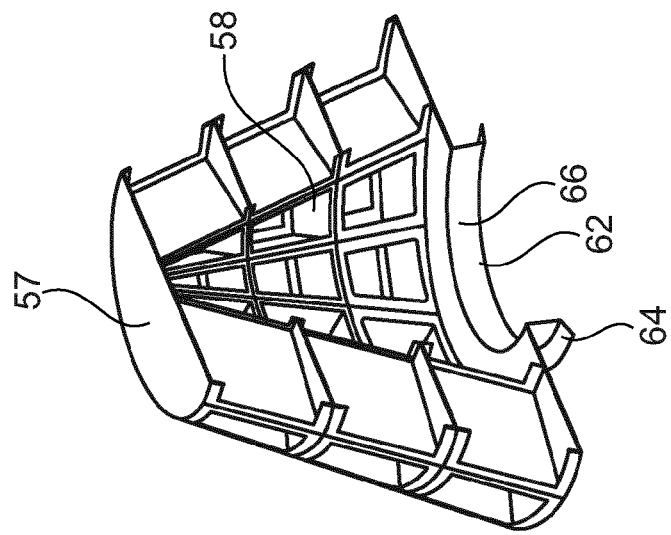
FIG. 8 is a perspective sectional view of the filter element from FIGS. 6 and 7.
Figure 7:
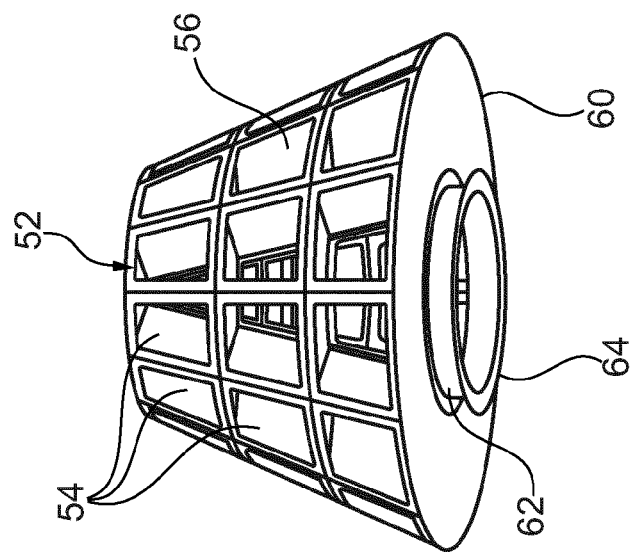
FIG. 7 is a perspective view from below of the filter element according to the invention from FIG. 6.
Figure 6:
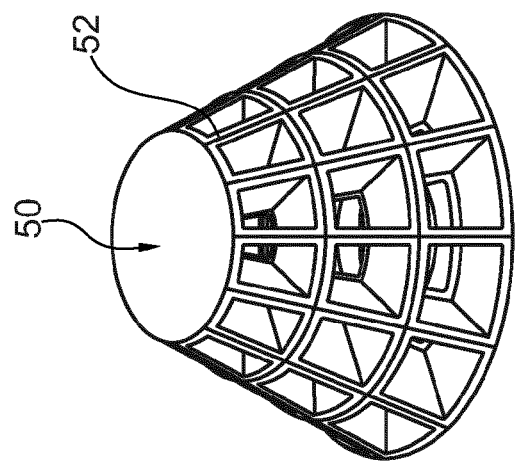
FIG. 6 is a perspective view from above of a filter element according to the invention.

The structure of a filter element 50 according to the invention is illustrated in FIGS. 6 to 8. The filter element 50 has a metallic, ring-disk-shaped base 60, on the underside of which a sleeve-shaped attachment piece 62 is arranged. A ring-disk-shaped sealing collar 64 is arranged at the lower edge of this attachment piece and has a slightly conical shape that tapers upwards. The conical sealing collar 64 corresponds to a correspondingly conical receiving flange 39 on the centering piece 38 of the painting facility 10 so as to facilitate centering of the filter element 50 on the centering piece 38.

A filter unit 52 having the shape of a truncated cone is arranged on the metallic base 60 and is designed as a disposable element. The filter unit 52 is made up of individual cartridge-like filter cells 54 whose basic frames are preferably made of cardboard. A suitable filter material, such as paper, a textile, etc., or a combination of different materials, is arranged inside the filter cells 52 to form the filter surface 56. The conical outer circumference area of the filter element 50 enables air to be extracted both from the top and from the side, so that air containing paint overspray is extracted especially well and can therefore be kept away from the surrounding side walls 22 of an extraction station 20.

The filter cells 52 surround a cone-shaped filter interior 58, from which the filtered air can be led away downwards via the outlet opening 66 by the extraction device 30. A top side of the filter element 50 having the shape of a truncated cone is provided with a cover plate 57, which can preferably be made of cardboard.

The invention claimed is:

1. A painting facility for painting a workpiece, having
a painting station, in which a coating can be sprayed onto the workpiece by way of at least one painting device, and
an extraction station, which is arranged underneath the painting station and has an extraction device with a filter element, via which air with overspray can be extracted out of the painting station, wherein overspray is separated out of the extracted air at the filter element,
wherein the painting station at the top is separated from the extraction station at the bottom via an air-permeable, separating floor,
wherein
an extraction opening having a centering piece in a base region for leading away exhaust air is arranged in a lower region of the extraction station,
the filter element is placed onto the upward-facing extraction opening with the centering piece and can be detached therefrom by lifting,
the filter element has an outer circumference region that tapers upwards from a base, and
the filter element is arranged centrally and free in an extraction chamber of the extraction station, which extraction chamber is delimited by side walls.

2. The painting facility according to claim 1, wherein
at least one air inlet opening is provided on the painting station, through which air inlet opening air can be fed.

3. The painting facility according to claim 2, wherein
the at least one air inlet opening is arranged above the workpiece, wherein air can be fed through the air inlet opening onto the workpiece.

4. The painting facility according to claim 2, wherein
the at least one air inlet opening is connected to the extraction opening via at least one duct, wherein at least part of the filtered exhaust air can be fed back into the painting station.

5. The painting facility according to claim 1, wherein
the filter element is provided with a filter surface, which is designed to let through air and separate overspray out of the air, and an outlet opening to discharge filtered air out of the filter element,
the filter element has a base, in which the outlet opening is formed roughly centrally, and
above the base, the filter surface forms an outer circumference region of the filter element and encloses a filter interior, which is connected to the outlet opening.

6. The painting facility according to claim 5, wherein
the base is made of metal for receiving and holding a detachable filter unit, and
a sleeve-shaped attachment piece is provided on the underside of the base and is designed to be detachably placed onto an extraction opening of a painting facility.

7. The painting facility according to claim 6, wherein
at least the detachable filter unit is designed as a disposable element.

8. The painting facility according to claim 6, wherein
the filter unit has an outer circumference region that tapers upwards from the base.

9. The painting facility according to claim 6, wherein
filter cells are provided to form the filter surface and are made at least in part of a cardboard or paper material.

10. The painting facility according to claim 1, wherein
the filter element and/or the filter unit has the form of a cone, a truncated cone, a hemisphere, a smooth pyramid or a stepped pyramid.

11. A method for painting a workpiece, wherein
in a painting station, a coating is sprayed onto the workpiece by way of at least one painting device, and
in an extraction station, which is arranged underneath the painting station, air with overspray is extracted out of the painting station via an extraction device with a filter element, wherein overspray is separated out of the extracted air at the filter element,
wherein the air with overspray is extracted out of the painting station into the extraction station via an air-permeable, separating floor, which separates the painting station at the top from the extraction station at the bottom, wherein
the exhaust air is led away via an upward-facing extraction opening with a centering piece in a base region, which extraction opening is arranged in a lower region of the extraction station,
the filter element has an outer circumference region that tapers upwards from a base and is detachably placed onto the extraction opening with the centering piece, wherein the filter element is arranged centrally and free in an extraction chamber of the extraction station, which extraction chamber is delimited by side walls, and
the filter element is detached by lifting from the extraction opening.

12. The method according to claim 11, using
a painting facility having
a painting station, in which a coating can be sprayed onto the workpiece by way of at least one painting device, and
an extraction station, which is arranged underneath the painting station and has an extraction device with a filter element, via which air with overspray can be extracted out of the painting station, wherein overspray is separated out of the extracted air at the filter element,
wherein the painting station at the top is separated from the extraction station at the bottom via an air-permeable, separating floor,
wherein—an extraction opening having a centering piece in a base region for leading away exhaust air is arranged in a lower region of the extraction station,
the filter element is placed onto the upward-facing extraction opening with the centering piece and can be detached therefrom by lifting,
the filter element has an outer circumference region that tapers upwards from a base, and
the filter element is arranged centrally and free in an extraction chamber of the extraction station, which extraction chamber is delimited by side walls.

* * * * *